US012672996B1

(12) United States Patent
Skinner

(10) Patent No.: US 12,672,996 B1
(45) Date of Patent: Jul. 7, 2026

(54) PATIENT LIFTING DEVICE

(71) Applicant: Peter Skinner, New Orleans, LA (US)

(72) Inventor: Peter Skinner, New Orleans, LA (US)

(*) Notice: Subject to any disclaimer, the term of this patent is extended or adjusted under 35 U.S.C. 154(b) by 370 days.

(21) Appl. No.: 18/233,961

(22) Filed: Aug. 15, 2023

(51) Int. Cl.
*A61G 7/10* (2006.01)

(52) U.S. Cl.
CPC .................................. *A61G 7/1038* (2013.01)

(58) Field of Classification Search
CPC ................................ A61G 7/1038; A45F 3/14
See application file for complete search history.

(56) References Cited

U.S. PATENT DOCUMENTS 1,879,480 A 9/1932 Pures
D311,804 S 10/1990 Eliasson
8,657,166 B1 2/2014 Harness
9,585,463 B2 3/2017 Lourie
9,932,208 B2 4/2018 Mealy
11,013,653 B1 5/2021 Atkins
11,284,699 B2 3/2022 Fontaine
2022/0110439 A1* 4/2022 Karovic ................. B63H 16/04

FOREIGN PATENT DOCUMENTS

CA 3108486 8/2021
WO WO-2012068345 A1 * 5/2012 ............... A45F 3/14

* cited by examiner

*Primary Examiner* — Adam C Ortiz

(57) ABSTRACT

The patient lifting device is a therapeutic device for use with a caregiver and a patient. The patient lifting device increases the mobility of the patient by transferring a portion of the load of the patient to the caregiver. The patient lifting device includes a first non-euclidean supporting structure, a second non-euclidean supporting structure, and a pivot structure. The pivot structure attaches the second non-euclidean supporting structure to the first non-euclidean supporting structure. The first non-euclidean supporting structure transfers a portion of the load of the patient to the caregiver. The second non-euclidean supporting structure transfers a portion of the load of the patient to the caregiver.

10 Claims, 4 Drawing Sheets

PATIENT LIFTING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of manual lifting aids. (A61G7/1038)

SUMMARY OF INVENTION

The patient lifting device is a therapeutic device. The patient lifting device is adapted for use with a caregiver. The patient lifting device is adapted for use with a patient. The patient lifting device is a mobility assistance device. The patient lifting device increases the mobility of the patient by transferring a portion of the load of the patient to the caregiver. The patient lifting device comprises a first non-euclidean supporting structure, a second non-euclidean supporting structure, and a pivot structure. The pivot structure attaches the second non-euclidean supporting structure to the first non-euclidean supporting structure. The first non-euclidean supporting structure transfers a portion of the load of the patient to the caregiver. The second non-euclidean supporting structure transfers a portion of the load of the patient to the caregiver. The pivot structure allows for the adjustment of the patient lifting device to accommodate changes in the relative sizes between the caregiver and the patient.

These together with additional objects, features and advantages of the patient lifting device will be readily apparent to those of ordinary skill in the art upon reading the following detailed description of the presently preferred, but nonetheless illustrative, embodiments when taken in conjunction with the accompanying drawings.

In this respect, before explaining the current embodiments of the patient lifting device in detail, it is to be understood that the patient lifting device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the patient lifting device.

It is therefore important that the claims be regarded as including such equivalent construction insofar as they do not depart from the spirit and scope of the patient lifting device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
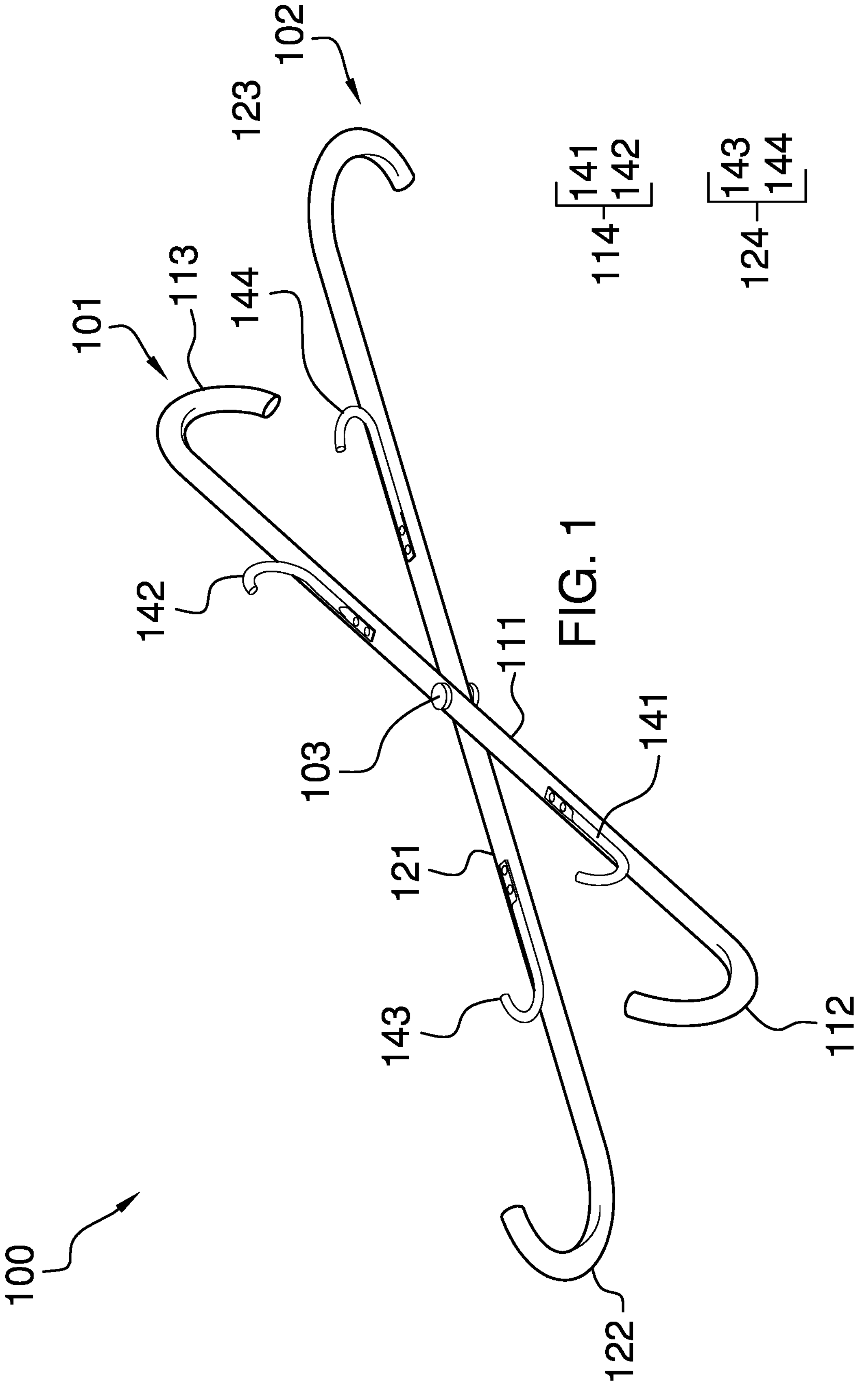
FIG. 1 is a perspective view of an embodiment of the disclosure.
Figure 2:
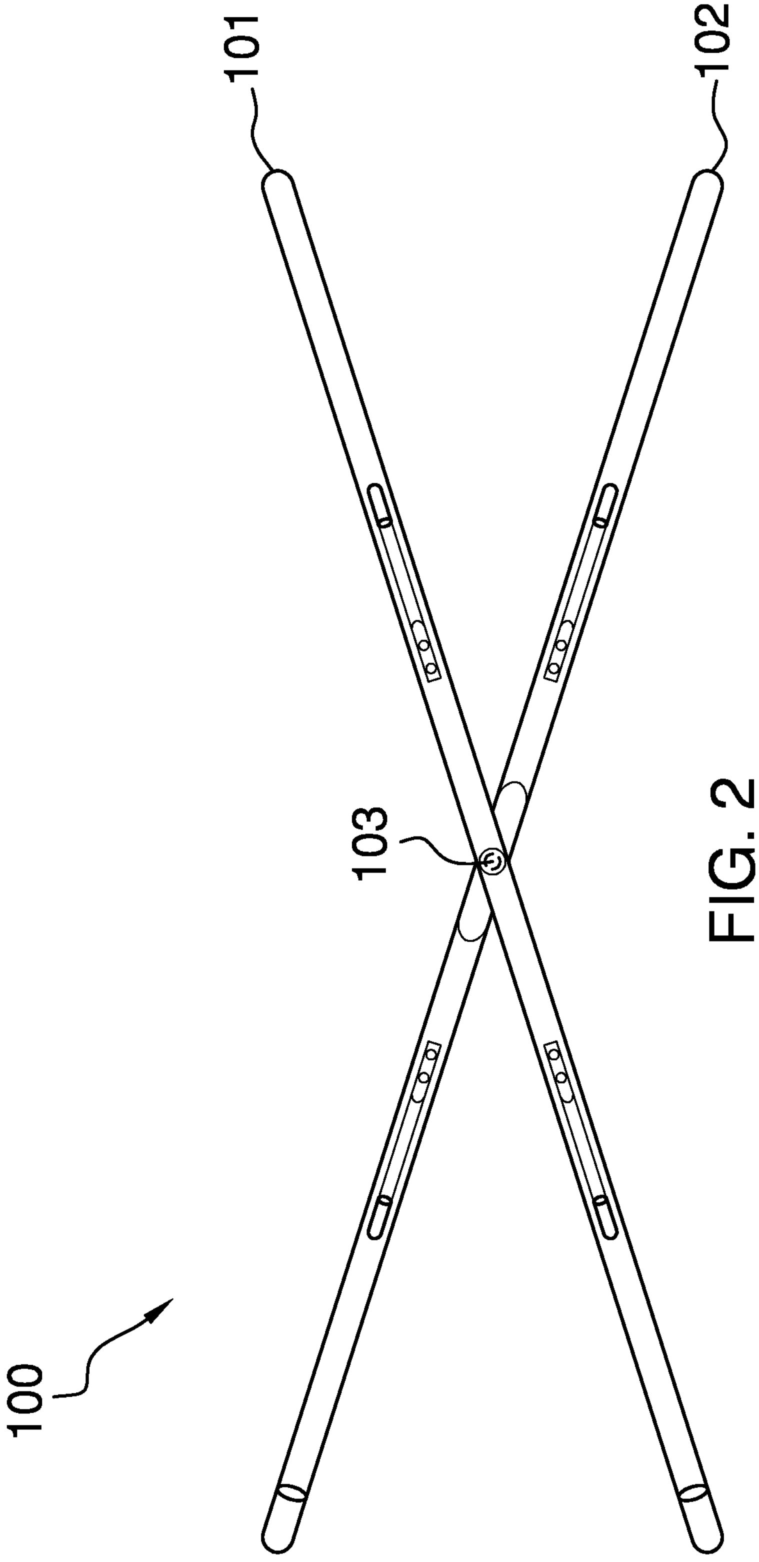
FIG. 2 is a top view of an embodiment of the disclosure.
Figure 3:
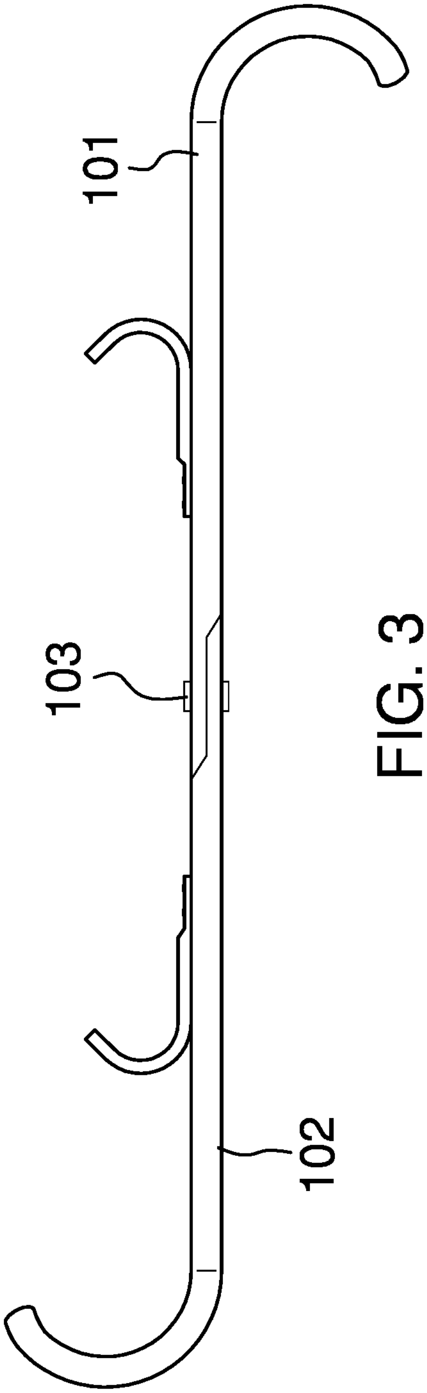
FIG. 3 is a side view of an embodiment of the disclosure.
Figure 4:
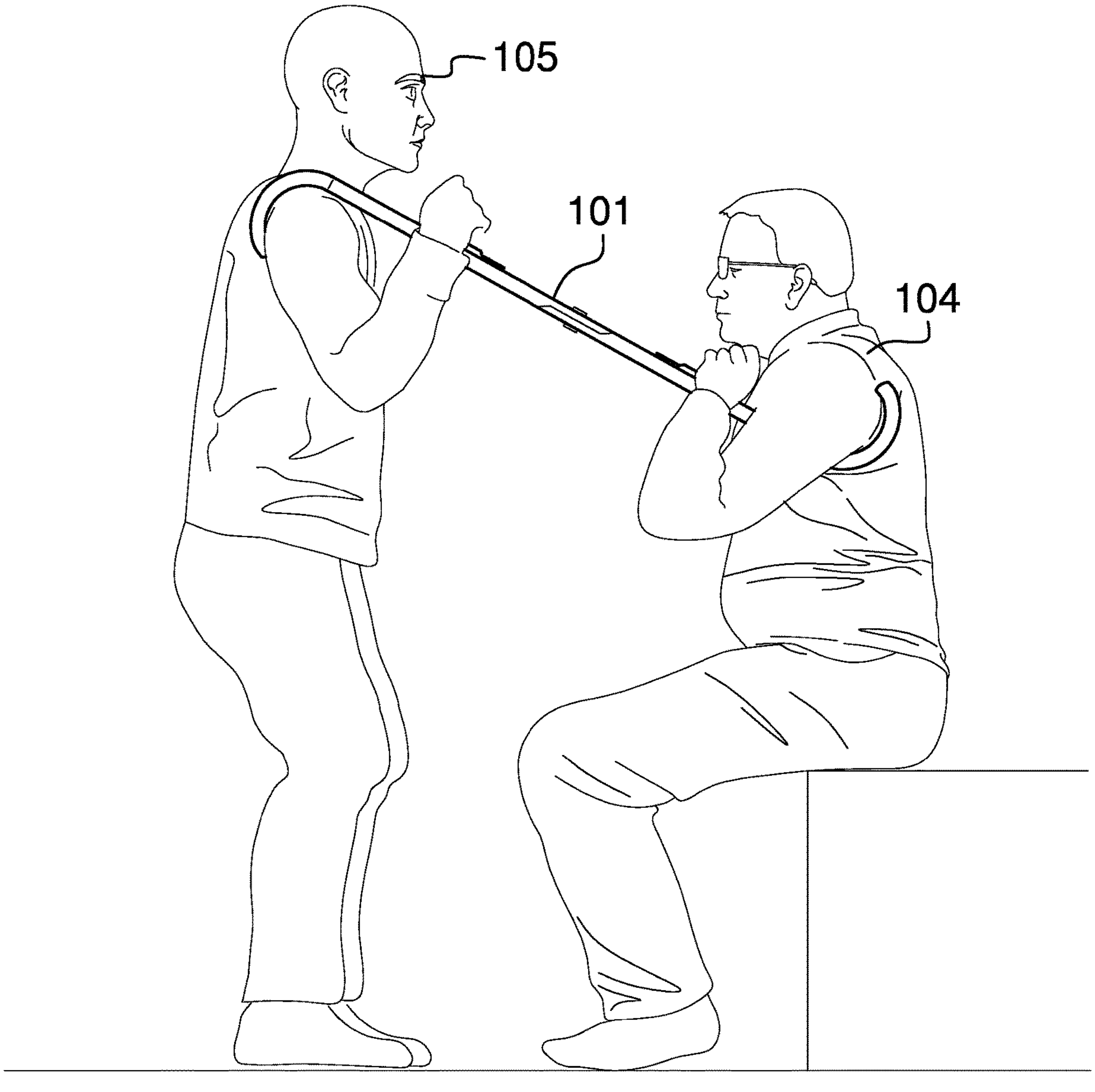
FIG. 4 is an in-use view of an embodiment of the disclosure.

Detailed reference will now be made to one or more potential embodiments of the disclosure, which are illustrated in FIGS. 1 through 4.

The patient lifting device 100 (hereinafter invention) is a therapeutic device. The invention 100 is adapted for use with a caregiver 105. The invention 100 is adapted for use with a patient. The invention 100 is a mobility assistance device. The invention 100 increases the mobility of the patient by transferring a portion of the load of the patient to the caregiver 105. The invention 100 comprises a first non-euclidean supporting structure 101, a second non-euclidean supporting structure 102, and a pivot structure 103. The pivot structure 103 attaches the second non-euclidean supporting structure 102 to the first non-euclidean supporting structure 101. The first non-euclidean supporting structure 101 transfers a portion of the load of the patient 104 to the caregiver 105. The second non-euclidean supporting structure 102 transfers a portion of the load of the patient 104 to the caregiver 105. The pivot structure 103 allows for the adjustment of the invention 100 to accommodate changes in the relative sizes between the caregiver 105 and the patient 104.

The patient 104 is defined elsewhere in this disclosure. The caregiver 105 is defined elsewhere in this disclosure.

The first non-euclidean supporting structure 101 is a rigid structure. The first non-euclidean supporting structure 101 is a load bearing structure. The first non-euclidean supporting structure 101 transfers a portion of the load of the patient 104 to the caregiver 105. The first non-euclidean supporting structure 101 has a non-euclidean prism structure. The first non-euclidean supporting structure 101 hooks onto the right shoulder of the patient 104. The first non-euclidean supporting structure 101 hooks onto the right shoulder of the caregiver 105. The first non-euclidean supporting structure 101 transfers a portion of the load of the patient 104 from the right shoulder of the patient 104 to the right shoulder of the caregiver 105. The first non-euclidean supporting structure 101 is formed with an s-hook structure. The first non-euclidean supporting structure 101 comprises a first extension structure 111 and a first handle structure 114.

The first extension structure 111 is a rigid structure. The first extension structure 111 is a load bearing structure. The first extension structure 111 forms the primary shape of the first non-euclidean supporting structure 101. The first extension structure 111 secures the right shoulder of the patient 104 to the right shoulder of the caregiver 105. The first extension structure 111 transfers the load from the right shoulder of the patient 104 to the right shoulder of the caregiver 105. The first extension structure 111 is formed with an s-hook structure. The first extension structure 111 further comprises a first caregiver hook 112 and a first patient 104 hook 113.

The first caregiver hook 112 secures the first extension structure 111 to the right shoulder of the caregiver 105. The first caregiver hook 112 is a curvature that is formed in a first congruent end region of the non-euclidean prism structure of the first extension structure 111. The curvature of the first caregiver hook 112 is formed such that the first caregiver hook 112 hooks around the right shoulder of the patient 104.

The first patient 104 hook 113 secures the first extension structure 111 to the right shoulder of the patient 104. The first patient 104 hook 113 is a curvature that is formed in a second congruent end region of the non-euclidean prism structure of the first extension structure 111. The curvature of the first patient 104 hook 113 is formed such that the first patient 104 hook 113 hooks around the right shoulder of the patient 104.

The first handle structure 114 is a mechanical structure used by the caregiver 105 to gain a secure grip on the first non-euclidean supporting structure 101. The first handle structure 114 is a mechanical structure used by the patient 104 to gain a secure grip on the first non-euclidean supporting structure 101. The first handle structure 114 further comprises a first grip structure 141 and a second grip structure 142.

The first grip structure 141 mounts on the lateral face of the non-euclidean prism structure of the first extension structure 111. The first grip structure 141 forms a grip that is grasped by the right hand of the caregiver 105. The second grip structure 142 mounts on the lateral face of the non-euclidean prism structure of the first extension structure 111. The second grip structure 142 forms a grip that is grasped by the right hand of the patient 104.

The second non-euclidean supporting structure 102 is a rigid structure. The second non-euclidean supporting structure 102 is a load bearing structure. The second non-euclidean supporting structure 102 transfers a portion of the load of the patient 104 to the caregiver 105. The second non-euclidean supporting structure 102 has a non-euclidean prism structure. The second non-euclidean supporting structure 102 hooks onto the left shoulder of the patient 104. The second non-euclidean supporting structure 102 hooks onto the left shoulder of the caregiver 105. The second non-euclidean supporting structure 102 transfers a portion of the load of the patient 104 from the left shoulder of the patient 104 to the left shoulder of the caregiver 105. The second non-euclidean supporting structure 102 is formed with an s-hook structure. The second non-euclidean supporting structure 102 is geometrically identical to the first non-euclidean supporting structure 101. The second non-euclidean supporting structure 102 comprises a second extension structure 121 and a second handle structure 124.

The second extension structure 121 is a rigid structure. The second extension structure 121 is a load bearing structure. The second extension structure 121 forms the primary shape of the second non-euclidean supporting structure 102. The second extension structure 121 secures the left shoulder of the patient 104 to the left shoulder of the caregiver 105. The second extension structure 121 transfers the load from the left shoulder of the patient 104 to the left shoulder of the caregiver 105. The second extension structure 121 is formed with an s-hook structure. The second extension structure 121 further comprises a second caregiver hook 122 and a second patient 104 hook 123.

The second caregiver hook 122 secures the second extension structure 121 to the left shoulder of the caregiver 105. The second caregiver hook 122 is a curvature that is formed in a third congruent end region of the non-euclidean prism structure of the second extension structure 121. The curvature of the second caregiver hook 122 is formed such that the second caregiver hook 122 hooks around the left shoulder of the patient 104.

The second patient 104 hook 123 secures the second extension structure 121 to the left shoulder of the patient 104. The second patient 104 hook 123 is a curvature that is formed in a fourth congruent end region of the non-euclidean prism structure of the second extension structure 121. The curvature of the second patient 104 hook 123 is formed such that the second patient 104 hook 123 hooks around the left shoulder of the patient 104.

The second handle structure 124 is a mechanical structure used by the caregiver 105 to gain a secure grip on the second non-euclidean supporting structure 102. The second handle structure 124 is a mechanical structure used by the patient 104 to gain a secure grip on the second non-euclidean supporting structure 102. The second handle structure 124 further comprises a third grip structure 143 and a fourth grip structure 144.

The third grip structure 143 mounts on the lateral face of the non-euclidean prism structure of the second extension structure 121. The third grip structure 143 forms a grip that is grasped by the left hand of the caregiver 105. The fourth grip structure 144 mounts on the lateral face of the non-euclidean prism structure of the second extension structure 121. The fourth grip structure 144 forms a grip that is grasped by the left hand of the patient 104.

The pivot structure 103 is a fastening structure. The pivot structure 103 secures the second non-euclidean supporting structure 102 to the first non-euclidean supporting structure 101 to form an offset lateral prism structure. The pivot structure 103 secures the second non-euclidean supporting structure 102 to the first non-euclidean supporting structure 101 such that the second non-euclidean supporting structure 102 rotates relative to the first non-euclidean supporting structure 101. The rotation of the second non-euclidean supporting structure 102 relative to the first non-euclidean supporting structure 101 allows for the adjustment of the cant between the center axis of the non-euclidean prism structure of the second non-euclidean supporting structure 102 and the center axis of the non-euclidean prism structure of the first non-euclidean supporting structure 101. The selection of the cant between the second non-euclidean supporting structure 102 and the first non-euclidean supporting structure 101 allows the invention 100 to adjust to variations in relative sized of the caregiver 105 and the patient 104.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Appendage: As used in this disclosure, appendage is a generic term used to describe one or more limbs of a patient.

Brace: As used in this disclosure, a brace is a rigid structural element that interconnects a first object with a second object to form a resulting object. The brace forms an energy transfer structure that transfers, distributes, and shares a force acting on the first object between the first object and the second object. The brace is used to support, stabilize, or otherwise steady an object.

Cant: As used in this disclosure, a cant is an angular deviation from one or more reference lines (or planes) such as a vertical line (or plane) or a horizontal line (or plane).

Caretaker: As used in this disclosure, a caretaker is an individual who is designated to provide therapeutic services to a patient.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal and Proximal: As used in this disclosure, the terms distal and proximal refers to a directional sense or location relative to the medial axis of the body. When comparing the location of a first object relative to a second object, when the minimum span of the distance between the first object and the medial axis is greater than the minimum span of the distance between the second object and the medial axis, the first object is said to be the distal object or the object distal from the medial axis. Alternately, when the minimum span of the distance between the first object and the medial axis is lesser than the minimum span of the distance between the second object and the medial axis, the first object is said to be the proximal object or the object proximal to the medial axis.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, lateral refers to a directional sense or location of the body. Specifically, lateral refers to an object or a side of an object that is proximal to the side or that is distal from the medial axis of the body. The lateral direction movement is always perpendicular to the anterior posterior axis. Lateral movement is often called sideways movement.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side 19 of any object is the same side as the right side of the human body when the object is viewed is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Medial: As used in this disclosure, medial refers to a directional sense or location of the body. Specifically, medial refers to a first object or a side of a first object that is closer to the medial axis or more distal from the side of the body relative to a second object or side of a second object.

Mobility Assistance Device: As used in this disclosure, a mobility assistance device is a mechanical device used to help patients with limited mobility to move.

Neck: As used in this disclosure, the neck refers to the portion of a biological entity that attaches the head of the biological entity to the torso of the biological entity.

Negative Space: As used in this disclosure, negative space is a method of defining an object through the use of open or empty space as the definition of the object itself, or, through the use of open or empty space to describe the boundaries of an object.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Offset Lateral Prism Structure: As used in this disclosure, an offset lateral prism structure refers to the juxtaposition of a first lateral face of a first prism structure to a second lateral face of a second prism structure in the manner of a lateral prism structure except that one or more of the following conditions need not be true: a) the center axes of the first prism and the second prism are no longer parallel; and, b) the congruent ends of the first prism are no longer parallel to the congruent ends of the second prism.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the anterior of the object.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

S-Hook: As used in this disclosure, the S-hook is a non-Euclidean prism structure that has the shape of the letter S. The S-hook is a fastening device that attaches a first object to a second object. Specifically, the S-hook hangs from the first object such that the second object may be suspended from the first object. The S-hook is a well-known and commercially available structure.

Shoulder: As used in this disclosure, a shoulder is a rotating structure of a human body that attaches the arm to the torso.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Therapeutic: As used in this disclosure, therapeutic is an adjective that refers to a medical, ameliorative, or hygienic substance, process, procedure, or device.

Torso: As used in this disclosure, the torso refers to the portion of a human body between the neck and the pelvis. The spine is primarily contained within the torso.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A patient lifting device comprising a first non-euclidean supporting structure, a second non-euclidean supporting structure, and a pivot structure;

wherein the pivot structure attaches the second non-euclidean supporting structure to the first non-euclidean supporting structure;

wherein the first non-euclidean supporting structure and the second non-euclidean supporting structure are each rigid structures;

wherein the first non-euclidean supporting structure is adapted to hook onto a right shoulder of a patient as well as a right shoulder of a caregiver;

wherein the second non-euclidean supporting structure is adapted to hook onto a left shoulder of the patient as well as a left shoulder of a caregiver;

wherein the first non-euclidean supporting structure comprises a first extension structure and a first handle structure;

wherein the second non-euclidean supporting structure comprises a second extension structure and a second handle structure;

wherein the first extension structure is adapted to secure the right shoulder of the patient to the right shoulder of the caregiver in order to transfer the load from the right shoulder of the patient to the right shoulder of the caregiver;

wherein the second extension structure is adapted to secure the left shoulder of the patient to the left shoulder of the caregiver in order to transfers the load from the left shoulder of the patient to the left shoulder of the caregiver.

2. The patient lifting device according to claim 1 wherein the patient lifting device is a therapeutic device;

wherein the patient lifting device is adapted for use with the caregiver;

wherein the patient lifting device is adapted for use with the patient;

wherein the patient lifting device is a mobility assistance device;

wherein the patient lifting device increases the mobility of the patient by transferring a portion of the load of the patient to the caregiver.

3. The patient lifting device according to claim 2 wherein the first non-euclidean supporting structure transfers a portion of the load of the patient to the caregiver;

wherein the second non-euclidean supporting structure transfers a portion of the load of the patient to the caregiver;

wherein the pivot structure allows for the adjustment of the patient lifting device to accommodate changes in the relative sizes between the caregiver and the patient.

4. The patient lifting device according to claim 3 wherein the first non-euclidean supporting structure is a load bearing structure;

wherein the first non-euclidean supporting structure transfers a portion of the load of the patient to the caregiver;

wherein the first non-euclidean supporting structure has a non-euclidean structure;

wherein the first non-euclidean supporting structure transfers a portion of the load of the patient from the right shoulder of the patient to the right shoulder of the caregiver.

5. The patient lifting device according to claim 4 wherein the second non-euclidean supporting structure is a load bearing structure;

wherein the second non-euclidean supporting structure transfers a portion of the load of the patient to the caregiver;

wherein the second non-euclidean supporting structure has a non-euclidean structure;

wherein the second non-euclidean supporting structure transfers a portion of the load of the patient from the left shoulder of the patient to the left shoulder of the caregiver;

wherein the second non-euclidean supporting structure is geometrically identical to the first non-euclidean supporting structure.

6. The patient lifting device according to claim 5 wherein the pivot structure is a fastening structure;

wherein the pivot structure secures the second non-euclidean supporting structure to the first non-euclidean supporting structure to form an offset lateral structure;

wherein the pivot structure secures the second non-euclidean supporting structure to the first non-euclidean supporting structure such that the second non-euclidean supporting structure rotates relative to the first non-euclidean supporting structure;

wherein the rotation of the second non-euclidean supporting structure relative to the first non-euclidean supporting structure allows for the adjustment of the cant between the center axis of the non-euclidean structure of the second non-euclidean supporting structure and the center axis of the non-euclidean structure of the first non-euclidean supporting structure.

7. The patient lifting device according to claim 6
wherein the first handle structure attaches to the first extension structure;
wherein the second handle structure attaches to the second extension structure.

8. The patient lifting device according to claim 7
wherein the first extension structure is a rigid structure;
wherein the first extension structure is a load bearing structure;
wherein the first extension structure forms the primary shape of the first non-euclidean supporting structure;
wherein the first extension structure is formed with an s-hook structure;
wherein the second extension structure is a rigid structure;
wherein the second extension structure is a load bearing structure;
wherein the second extension structure forms the primary shape of the second non-euclidean supporting structure;
wherein the second extension structure is formed with an s-hook structure.

9. The patient lifting device according to claim 8
wherein the first extension structure further comprises a first caregiver hook and a first patient hook;
wherein the first caregiver hook secures the first extension structure to the right shoulder of the caregiver;
wherein the first caregiver hook is a curvature that is formed in a first congruent end region of the non-euclidean structure of the first extension structure;
wherein the curvature of the first caregiver hook is formed such that the first caregiver hook hooks around the right shoulder of the patient;
wherein the first patient hook secures the first extension structure to the right shoulder of the patient;
wherein the first patient hook is a curvature that is formed in a second congruent end region of the non-euclidean structure of the first extension structure;
wherein the curvature of the first patient hook is formed such that the first patient hook hooks around the right shoulder of the patient;
wherein the second extension structure further comprises a second caregiver hook and a second patient hook;
wherein the second caregiver hook secures the second extension structure to the left shoulder of the caregiver;
wherein the second caregiver hook is a curvature that is formed in a third congruent end region of the non-euclidean structure of the second extension structure;
wherein the curvature of the second caregiver hook is formed such that the second caregiver hook hooks around the left shoulder of the patient;
wherein the second patient hook secures the second extension structure to the left shoulder of the patient;
wherein the second patient hook is a curvature that is formed in a fourth congruent end region of the non-euclidean structure of the second extension structure;
wherein the curvature of the second patient hook is formed such that the second patient hook hooks around the left shoulder of the patient.

10. The patient lifting device according to claim 9
wherein the first handle structure is a mechanical structure used by the caregiver to gain a secure grip on the first non-euclidean supporting structure;
wherein the first handle structure is a mechanical structure used by the patient to gain a secure grip on the first non-euclidean supporting structure;
wherein the second handle structure is a mechanical structure used by the caregiver to gain a secure grip on the second non-euclidean supporting structure;
wherein the second handle structure is a mechanical structure used by the patient to gain a secure grip on the second non-euclidean supporting structure.

* * * * *